(12) United States Patent
Seel et al.

(10) Patent No.: US 6,247,741 B1
(45) Date of Patent: Jun. 19, 2001

(54) STOWAGE APPARATUS FOR A CARGO AREA OF A MOTOR VEHICLE

(75) Inventors: Holger Seel, Aidlingen; Klaus Haspel, Rottenburg; Werner P. Schlecht, Vaihingen-Enz-Aurich, all of (DE)

(73) Assignee: Baumeister & Ostler GmbH & Co., Aichwald/Aichshiess (DE)

(*) Notice: Subject to any disclaimer, the term of this patent is extended or adjusted under 35 U.S.C. 154(b) by 0 days.

(21) Appl. No.: 09/448,858

(22) Filed: Nov. 23, 1999

(30) Foreign Application Priority Data

Nov. 25, 1998 (DE) ................................ 198 54 365

(51) Int. Cl.$^7$ ..................................................... B60N 3/12
(52) U.S. Cl. ................... 296/37.14; 296/37.16; 296/37.2; 296/37.3
(58) Field of Search ............... 296/37.16, 37.14, 296/37.2, 37.3

(56) References Cited

U.S. PATENT DOCUMENTS

| | | | |
|---|---|---|---|
| 2,867,471 | * | 1/1959 | Coon .................................. 296/37.2 |
| 4,969,678 | * | 11/1990 | Loisel ................................ 296/37.16 |
| 4,991,898 | * | 2/1991 | Nomura .............................. 296/37.2 |
| 5,011,208 | * | 4/1991 | Lewallen ........................... 296/37.16 |
| 5,050,926 | * | 9/1991 | Tanaka ................................ 296/37.3 |
| 5,056,846 | * | 10/1991 | Tanaka ................................ 296/37.3 |
| 5,061,002 | * | 10/1991 | Saso .................................... 296/37.3 |
| 5,257,846 | * | 11/1993 | Kanie et al. ...................... 296/37.16 |
| 5,599,054 | * | 2/1997 | Butz et al. ......................... 296/37.14 |
| 5,636,890 | * | 6/1997 | Cooper ............................... 296/37.14 |
| 6,003,921 | * | 12/1999 | Tozuka ................................ 296/37.2 |
| 6,113,172 | * | 9/2000 | Chaloult et al. .................. 296/37.16 |
| 6,155,625 | * | 12/2000 | Felix .................................. 296/37.14 |

FOREIGN PATENT DOCUMENTS

| | | |
|---|---|---|
| 41 02 646 C2 | 10/1992 | (DE) . |
| 44 32 369 A1 | 3/1996 | (DE) . |
| 44 42 042 A1 | 5/1996 | (DE) . |

\* cited by examiner

*Primary Examiner*—Joseph D. Pape
*Assistant Examiner*—Kiran B. Patel
(74) *Attorney, Agent, or Firm*—McAndrews, Held & Malloy, Ltd.

(57) ABSTRACT

A stowage apparatus for a cargo area of a motor vehicle has a cargo area floor equipped with at least one recess. At least one insert frame fits into the at least one recess of the cargo area floor and can be fastened on the vehicle by an attachment mechanism. The present stowage apparatus is particularly suitable for passenger cars.

12 Claims, 8 Drawing Sheets

STOWAGE APPARATUS FOR A CARGO AREA OF A MOTOR VEHICLE

FIELD OF THE INVENTION

The present invention relates to a stowage apparatus for a cargo area of a motor vehicle that has a cargo area floor equipped with at least one recess.

BACKGROUND OF THE INVENTION

A cargo area floor of a passenger car is generally equipped with a depression in which a collapsible basket can be accommodated. The basket can be placed in the depression of the cargo area floor, and in its collapsed position terminates flush with the cargo area floor. A conventional stowage apparatus of this type is described in German Patent Publication No. DE 4432369 A1.

The present stowage apparatus has improved utilization capabilities in comparison to conventional stowage apparatus designs.

SUMMARY OF THE INVENTION

The foregoing objective is achieved by at least one insert frame that can be fitted into the recess of the cargo area floor and can be fastened on the vehicle side by way of an attachment mechanism. The insert frame can form the basis for a modular design in which different stowage modules for the cargo area are correspondingly made available and can be positioned in the cargo area floor. The insert frame is, in particular, fitted directly into the recess, present in the body, of the cargo area floor, and can in turn serve as receptacle for further functional inserts. The insert frame can, however, also be fitted into a depression of the cargo area floor that forms a covering part fastened at the top; the insert frame can then serve directly as a corresponding functional insert. The recess can be configured as a trough-like depression with a shaped floor, or as an opening that can be closed off by the insert frame.

In an embodiment of the present stowage apparatus, the insert frame has a peripheral upper terminating rim that is configured as a protective profile covering a lining of the cargo area floor. It is thereby possible to cover cut edges of the cargo area lining, in particular of a carpet, in the region of the recess of the cargo area floor, making this embodiment particularly advantageous when the insert frame is used on the body.

In a further embodiment of the present stowage apparatus, the insert frame is fastened detachably in the recess of the cargo area floor. This makes it possible to replace the insert frame or to reinsert it in a different position.

In a further embodiment of the present stowage apparatus, the insert frame and the recess are coordinated with one another in such a way that the insert frame can be inserted into the recess in two different positions rotated 180° with respect to one another. Turning the insert frame over about a horizontal axis allows the use of the insert frame for different functional purposes, the upper side having a function different from that of the underside.

In a further embodiment of the present stowage apparatus, the attachment mechanism is positioned such that they secure the insert frame in both inserted positions. As a result, secure retention of the insert frame in the cargo area floor is guaranteed for both functional positions of the insert frame, with no need to provide a separate attachment mechanism.

In a further embodiment of the present stowage apparatus, the attachment mechanism has at least one locking pin, movable between a release position arranged in countersunk fashion in a side rim of the insert frame and a locked position projecting outward beyond the side rim, which in the locked position penetrates into a corresponding receptacle of the recess of the cargo area floor. This results in positively fitting retention of the insert frame in the recess, which can easily be disengaged by correspondingly actuating the locking pin. The positively fitting retention of this embodiment is advantageous in particular in the event of a vehicle collision, in order to prevent the insert frame from being propelled through the cargo area or the passenger compartment.

In a further embodiment of the present stowage apparatus, at least one actuation element, in working engagement with the locking pin via a mechanical positive guide, is provided. The insert frame is thereby easily locked into or unlocked from the recess of the cargo area floor.

In a further embodiment of the present stowage apparatus, each locking pin is held in spring-loaded fashion in its locked position, and there engages onto a countersurface of the locking pin an obliquely oriented sliding surface of a linearly movable actuation element that is movable at right angles to the locking bolt in such a way that the countersurface and the sliding surface slide along one another, positively guided by the locking pin, when a movement of the actuation element occurs. A movement of the actuation element thus necessarily results in unlocking of the locking pin. If the sliding movement is produced along an inclined plane by way of a gated guide, the locking pin can also be guided into its locked position. If only the transfer into the unlocked position is controlled by the actuation element, the locking pin is correspondingly spring-loaded in the direction of the locked position.

In a further embodiment of the present stowage apparatus, the actuation element can be manipulated both from an upper side and from an underside of the insert frame, and the actuation element is equipped with two sliding surfaces, arranged with mirror symmetry, of which one is allocated to operation from the upper side and the other to operation from the underside. This makes it possible to ensure unlocking of the insert frame in both insertion positions by way of a single actuation element.

In a further embodiment of the present stowage apparatus, the insert frame is equipped with a bottom, arranged in a trough shape, that is delimited by the peripheral side rim of the insert frame, the side rim being coordinated with the depth of the recess in such a way that with the insert frame in the turned-over position, the bottom terminates flush with the cargo area floor.

The insert frame thus constitutes, in the turned-over insertion position, a planar and flush termination with the rest of the cargo area floor.

If necessary, the insert frame can be turned over and the trough shape can be used as a receptacle for items to be stowed.

In a further embodiment of the present stowage apparatus, the insert frame is equipped on its side opposite the bottom with a detachable cover, in particular with at least one pivoting lid. As a result, the open side of the insert frame can preferably also be closed off flush with the cargo area floor.

In a further embodiment of the present stowage apparatus, at least one flexible planar structure, wound onto a roller-shade shaft and capable of being pulled out, is integrated into the insert frame. As a result, the insert frame can perform several functions: at least one planar structure can be utilized both to partition the cargo area and to secure cargo on the cargo area floor.

In a further embodiment of the present stowage apparatus, at least one functional insert is integrated into the insert frame. A functional insert of this kind can be configured in the form of a stowage container or in the form of a mount for items to be secured in the cargo area, in particular as a bicycle mount.

In a further embodiment of the present stowage apparatus, an erectable retaining bracket arrangement, with which a net structure can be stretched out, is provided in the insert frame. The retaining bracket arrangement, which can comprise one or more retaining brackets, is folded down onto the bottom of the insert frame in the not-in-use rest position. A corresponding immobilization system, which can preferably be arranged in the region of hinge joints, is provided for the erected end position of the retaining bracket arrangement.

DETAILED DESCRIPTION OF THE PREFERRED EMBODIMENTS

Figure 1:
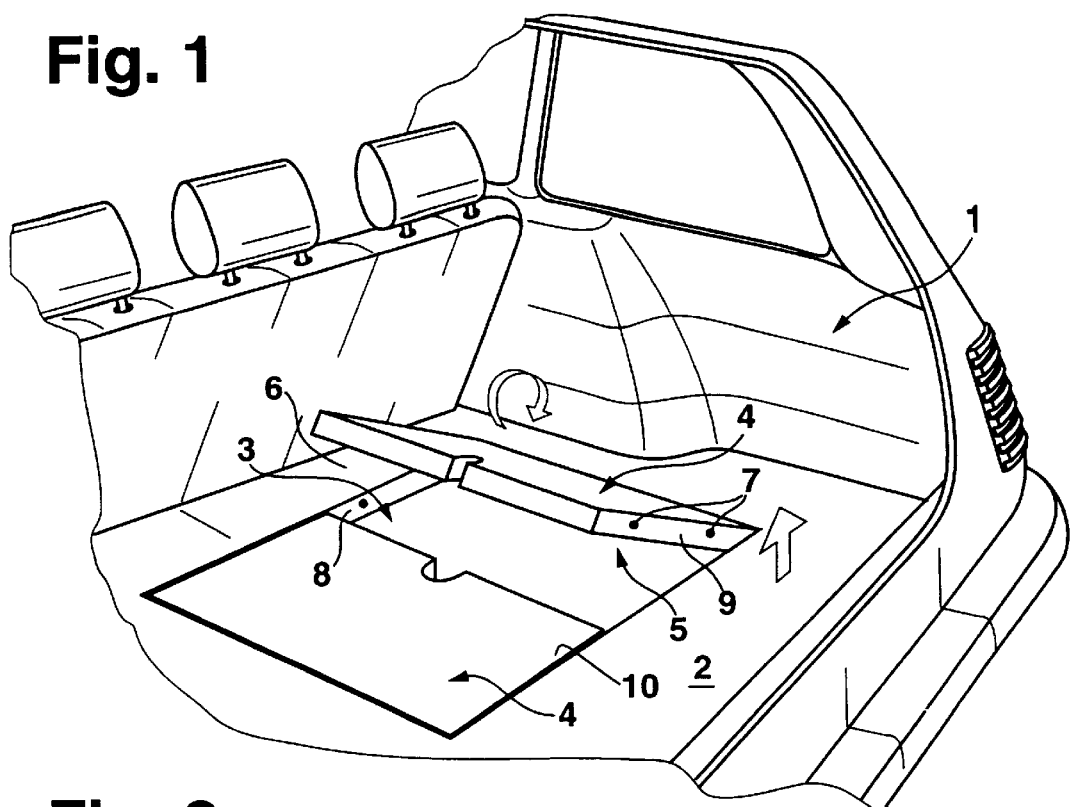
FIG. 1 shows, in perspective, a cargo area of a passenger car that is equipped with an embodiment of the present stowage apparatus.

A motor vehicle in the form of a station wagon or a van has, as shown in FIG. 1, a cargo area 1 that is equipped with a cargo area floor 2. Cargo area floor 2 is equipped with a rectangular recess in the form of a trough-like depression 3. Depression 3 has a horizontal bottom and is equipped with side rims projecting vertically upward. Depression 3 is constituted by a body-side depression in the floor of the vehicle body. In the same fashion, however, depression 3 can also be constituted by an insert frame, inserted separately into a body-side recess, that is equipped with the horizontal bottom. An insert frame of this kind (not shown) is thus fastened in body-side fashion onto the body floor.

Figure 2:
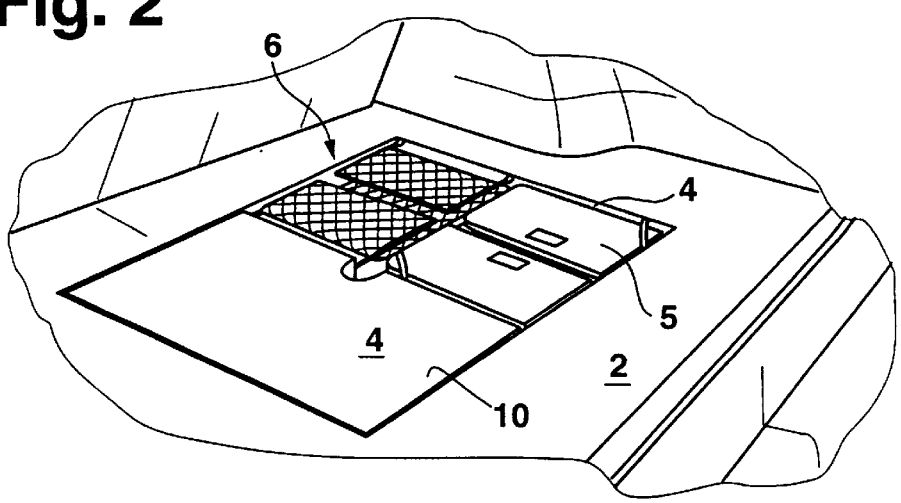
FIG. 2 shows the cargo area shown in FIG. 1, an insert frame being arranged in its position turned over with respect to FIG. 1.
Figure 3:
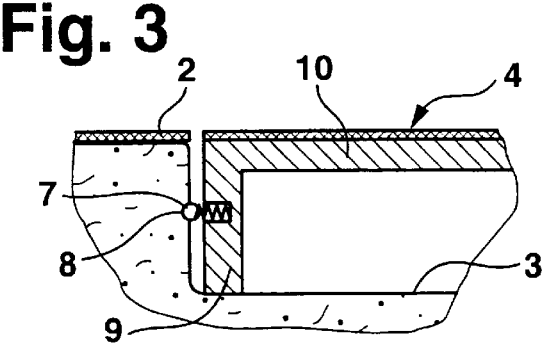
FIGS. 3 and 4 show schematically, in sectioned representations, the arrangements of the insert frames as shown in FIGS. 1 and 2 in the two different functional positions.
Figure 4:
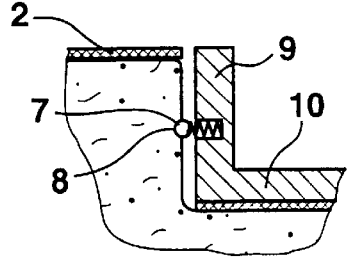

In the case of the exemplary embodiment shown in FIG. 1, two insert frames 4 of equal size are inserted detachably into depression 3 and together cover the base outline of depression 3. Both insert frames 4 are configured as troughs or boxes, by the fact that they have a flat bottom 10 from which a side rim 9, elevated at right angles, projects peripherally. As is evident from FIG. 2, the inner side of each insert frame 4 is equipped with two functional inserts 5, 6 that are constituted on the one hand by a folding container 5 and on the other hand by a receiving net 6 positioned in erectable retaining brackets. In its folded-in position, folding container 5 is retained on bottom 10 of insert frame 4 by two clamping straps (not described in further detail) in diagonally opposite corner regions. The retaining brackets are described again below with reference to the exemplary embodiment shown in FIGS. 15 and 16, so that at this juncture reference will simply be made to the later description. The height of the peripheral side rim 9 of each insert frame 4 is coordinated with the depth of depression 3 and its side rim in such a way that the two insert frames 4 can be fitted into depression 3 so their bottoms are flush with cargo area floor 2. Insert frames 4 can be inserted into depression 3 in the functional position shown in FIG. 1, in which the two bottoms 10 of insert frames 4 terminate in flush and planar fashion with cargo area floor 2. By turning the insert frames over about a horizontal axis (direction of arrow in FIG. 1), both insert frames 4 can also be inserted in correspondingly turned-over fashion into depression 3; in the exemplary embodiment shown, only the right-hand (viewed in the direction of travel) insert frame 4 shown in FIG. 2 has been brought into its turned-over functional position. In order to allow easy grasping of the insert frames when they are inserted, the insert frames 4 are each equipped with handle cutouts (not described further) which are positioned in FIG. 1 at the level of the middle of depression 3 in such a way that they lie opposite one another on the adjacent side edges.

The left-hand (viewed in the direction of travel) insert frame 4 can be equipped with the same functional inserts 5, 6 or also with different functional inserts. It can also be configured without additionally integrated functional inserts, so that in the turned-over state it serves as a simple stowage compartment.

In order to secure the two insert frames 4 in depression 3 of cargo area floor 2, an attachment mechanism in the form of snap-lock balls 7, which are movable in spring-loaded fashion and can engage into corresponding approximately semispherical depressions 8 in the side rim of depression 3, are provided. Snap-lock balls 7 are positioned on the peripheral side rim 9 of each functional insert 4 in corresponding receptacles, each snap-lock ball 7 additionally having associated with it a spring arrangement, in the form of a helical compression spring, positioned in the receptacle of side rim 9. The mounting of the snap-lock balls in the respective side rim 9 is not shown in detail. The snap-lock balls must be positioned in the receptacles in such a way that they are arranged movably between a locked position projecting outward beyond the side rim 9 and a release position terminating approximately flush with the outer side of side rim 9. Snap-lock balls 7 preferably project into receptacle 8 by an amount equal to less than half their diameter, so as to allow automatic release of each snap-lock ball 7 from the associated receptacle 8 when insert frame 4 is removed. In the exemplary embodiment shown, each side edge of depression 3 has associated with it two snap-lock balls 7 for each insert frame 4, which can engage into corresponding receptacles 8. It is also possible, however, to provide more or fewer snap-lock arrangements, constituted by snap-lock balls and corresponding snap-lock receptacles, for each side edge.

Figure 5:
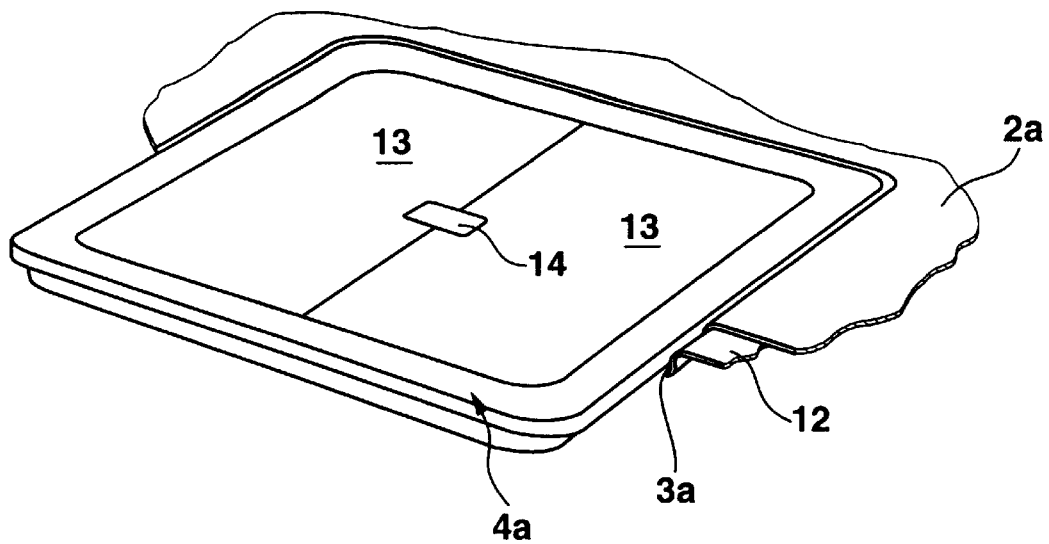
FIG. 5 shows a further embodiment of the present stowage apparatus for a cargo area of a motor vehicle.
Figure 6:
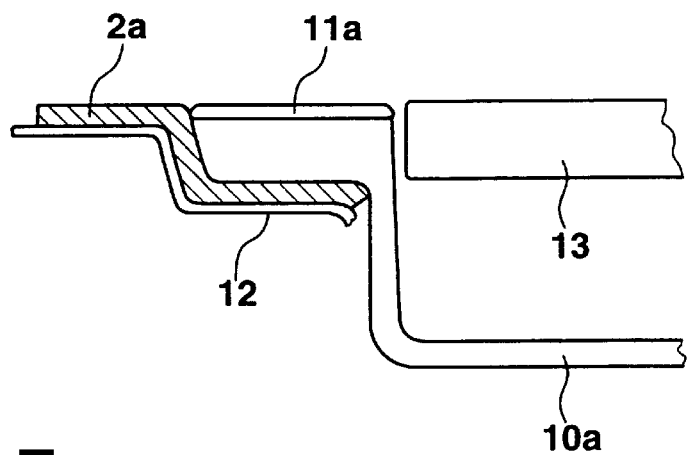
FIG. 6 shows, in an enlarged sectioned representation, a rim region of an insert frame of the stowage apparatus shown in FIG. 5.

In the exemplary embodiment according to FIGS. 5 and 6, an insert frame 4a is provided that is inserted into a body-mounted recess 3a of a body floor 12 of cargo area floor 2a of a corresponding station wagon or van. Body-mounted recess 3a can continue downward below insert frame 4a, and in particular can be provided for the reception of a spare wheel. Insert frame 4a is preferably held detachably in recess 3a. It can, however, also be positioned in recess 3a by way of a nondetachable attachment mechanism. Insert frame 4a is also of trough-shaped configuration and is equipped with a bottom 10a. Insert frame 4a has an upper rim profile 11a that is embedded in a corresponding step of body floor 12 and thus of recess 3a. This rim profile 11a forms a protective profile that covers a flexible lining of cargo area floor 2a in the edge regions of that covering in the region of recess 3a. The lining is preferably configured as a carpet. In this case rim profile 11a serves as a protective profile for the cut edges of the carpet, so that the latter are arranged in concealed fashion beneath rim profile 11a.

The trough-shaped configuration of insert frame 4a is closable by way of a two-part cover 13, the covering parts being immobilizable, by way of a shared interlock system 14, in the position closing off insert frame 4a. In the exemplary embodiment shown in FIGS. 5 and 6, cover 13 is constituted by two pivoting lids that can be mounted nondetachably or detachably in pivotably movable fashion on insert frame 4a.

Figure 7:
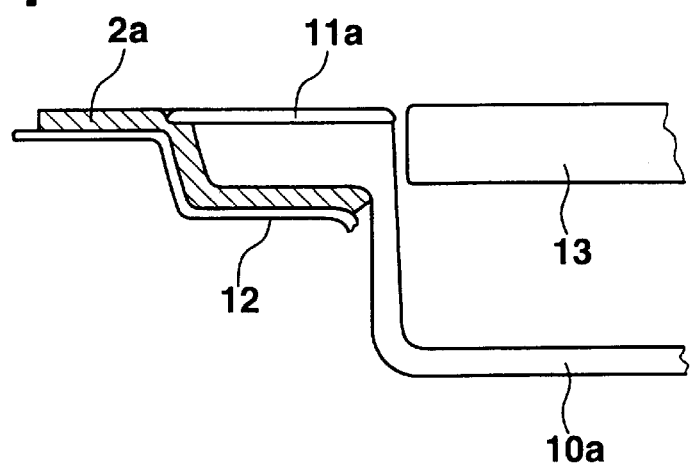
FIG. 7 shows, in an enlarged sectional representation, a rim region of a further insert frame similar to FIG. 6.

The insert frame shown in FIG. 7 is almost identical to insert frame 4a shown in FIGS. 5 and 6. The only difference is that the rim profile of insert frame 4a, configured as a protective profile, is equipped with an enlarged panel 11b that projects laterally out beyond the rim profile and constitutes a further improved covering of the carpet edge.

Figure 8:
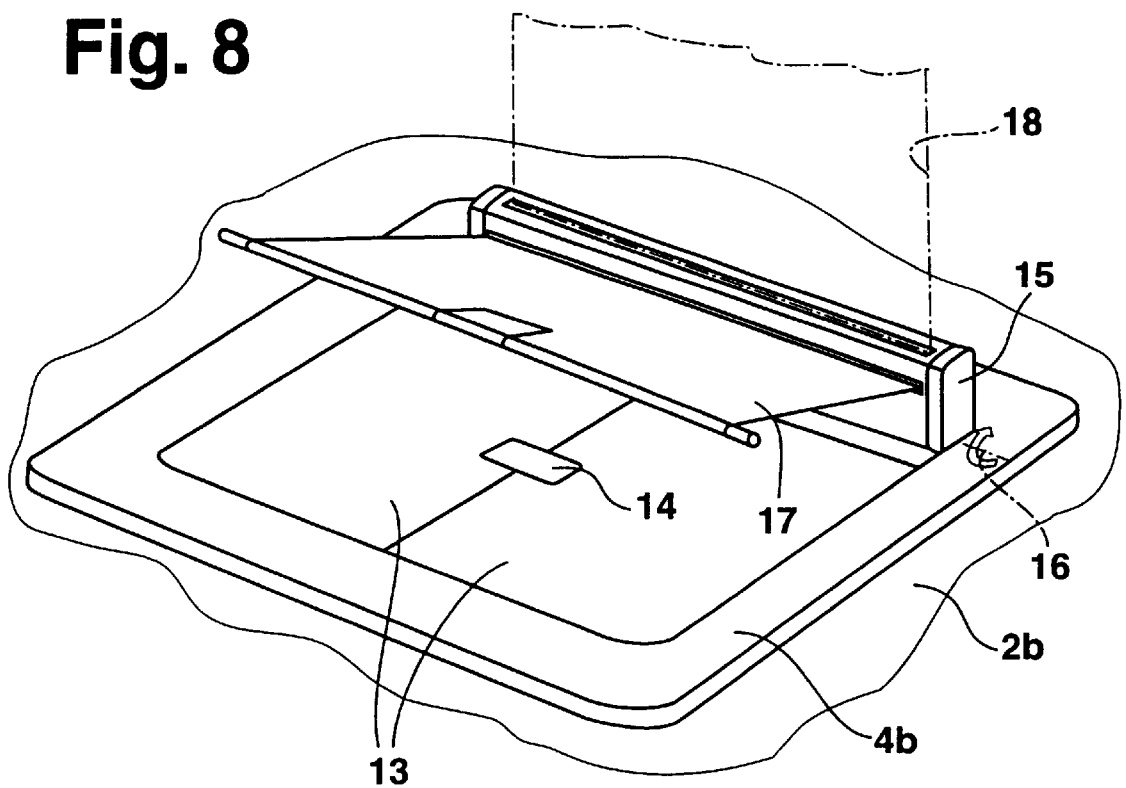
FIG. 8 shows a further embodiment of the present stowage apparatus having an integrated cassette housing which receives two flexible planar structures that can be rolled up.

An insert frame 4b for a cargo area floor 2b as shown in FIG. 8 corresponds in its basic construction to the insert frame described previously with reference to FIGS. 5–7. In the case of insert frame 4b, a cassette housing 15, which is mounted in insert frame 4b in pivotably movable fashion about a horizontal pivot axis 16 between a rest position and a functional position, is integrated into insert frame 4b. The position of cassette housing 15 shown in FIG. 8 represents the functional position, in which cassette housing 15 is retained by a corresponding stop, preferably by the rim of insert frame 4b. In complementary fashion, an additional mechanical locking apparatus can be provided that is manually unlockable and preferably snaps automatically into the functional position. Mounted in cassette housing 15 are two roller-shade shafts onto each of which is wound a flexible planar structure 17, 18, in the form of a separating net or a covering surface. An exit slot is provided for each planar structure 17, 18 in cassette housing 15, the one exit slot being provided for the planar structure on the vertical side of cassette housing 15 configured as a cover surface, and the other exit slot on the horizontal upper side of cassette housing 15. Flexible planar structures 17, 18 are preferably equipped, on the front (in the direction as pulled out) end surfaces, with pull-out bars that can be fastened to corresponding vehicle mounted holders.

Figure 9:
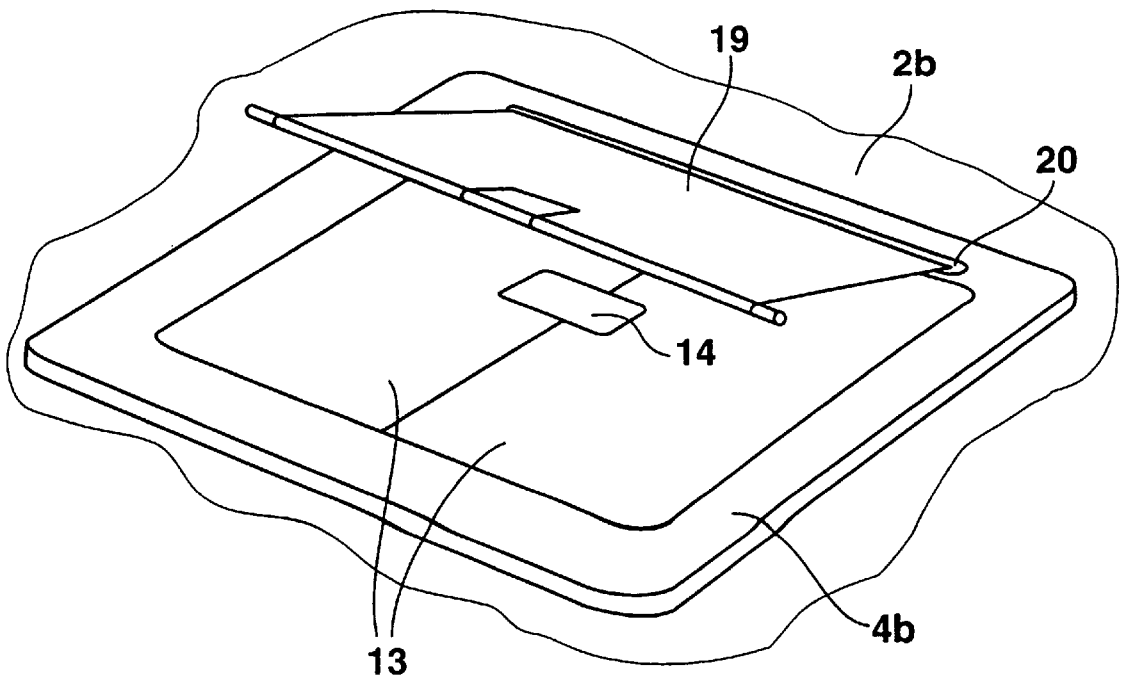
FIG. 9 shows a further embodiment of the present stowage apparatus having a further integrated planar structure that can be rolled up.

In the exemplary embodiment according to FIG. 9, what is mounted in insert frame 4d is not a cassette housing for retaining a planar structure, but a roller-shade shaft itself, onto which a flexible planar structure 19 is wound. The roller-shade shaft is mounted in rotatably movable fashion at its opposite ends in insert frame 4b, and is acted upon, in a manner known per se, by a return spring. An exit slot 20, through which flexible planar structure 19 is pulled, is provided in the rim profile of insert frame 4b.

Figure 10:
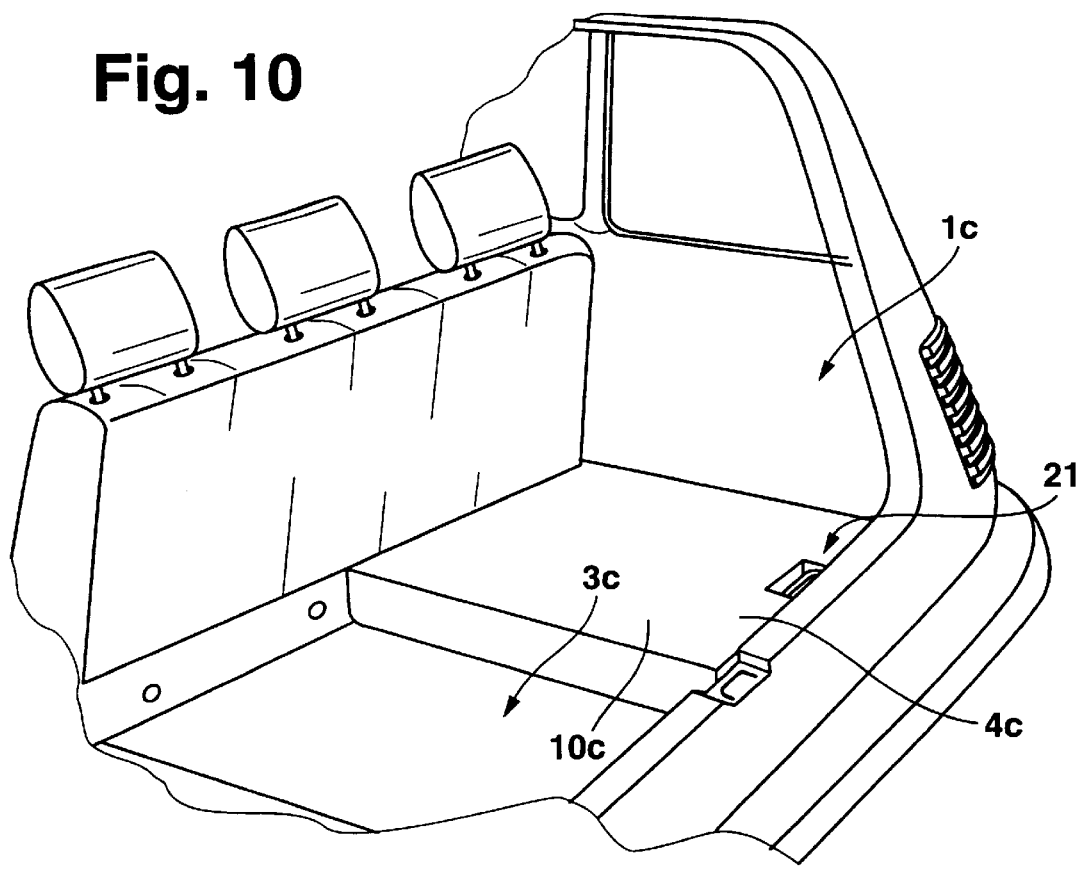
FIG. 10 shows, in a perspective representation, a cargo area having a recess, extending over the entire cargo area floor, which can be filled by two insert frames of equal size.
Figure 11A:
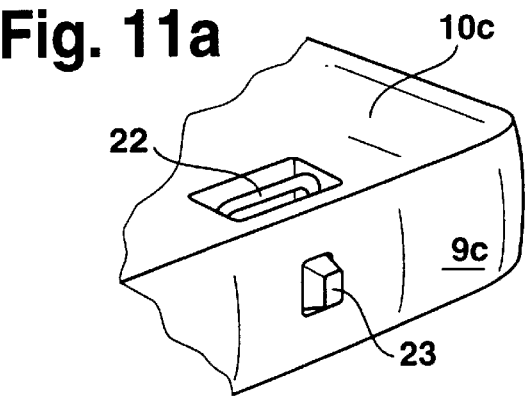
FIGS. 11a and 11b show the attachment mechanism for securing the insert frame as shown in FIG. 10 in the recess of the cargo area floor, in the interlocked locked position and the unlocked release position.

In the exemplary embodiment according to FIGS. 10, 11a, 11b, 12a and 12b, a cargo area 1c is equipped with a completely recessed cargo area floor, resulting in a stepped depression 3c that extends over the entire width and length of the cargo area. Two box-shaped or trough-shaped insert frames 4c, each of which has a rectangular base outline and is equipped with a continuous flat bottom 10 as well as peripheral side rims 9c, can be inserted into depression 3c. In FIG. 10 and in FIGS. 11a and 11b, insert frame 4c is shown in the one functional position in which bottom 10c faces upward and terminates flush with the remainder of the interior floor. In this functional position, bottom 1c constitutes the cargo area floor of cargo area 1c. Insert frame 4c is coordinated in terms of height with depression 3c, so that it completely fills up depression 3c. In the turned-over functional position according to FIGS. 12a and 12b, insert frame 4c constitutes a receiving container for stowing items. Various functional inserts can also be integrated into insert frame 4c, in a manner not shown in further detail.

Figure 12A:
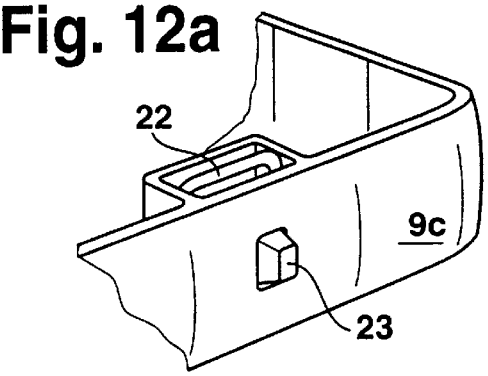
FIGS. 12a and 12b show the insert frame according to FIGS. 11a and 11b, but in correspondingly reversed positions.
Figure 11B:
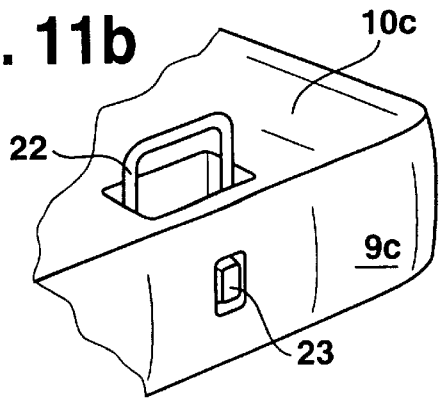
Figure 12B:
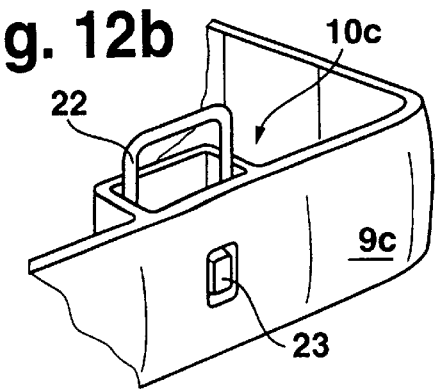

An attachment mechanism, in the form of a locking apparatus that is constituted by a central locking pin 23 and an actuation element 22 equipped with a handle, is provided in order to secure each insert frame 4c in depression 3c of cargo area 1c. Locking pin 23 is mounted in horizontally movable fashion in a corresponding recess of side rim 9c of insert frame 4c, its end positions being defined by the locked position shown in FIGS. 11a and 12a, and the release position shown in FIGS. 11b and 12b. In the locked position, locking pin 23 projects outward beyond side rim 9, 10, and can penetrate into a corresponding recess (not shown in more detail) of the side edge of depression 3c. Locking pin 23 is arranged at half the height of side rim 9c, and the corresponding receptacle of the side edge of depression 3c is also arranged at half the height of that side edge. As a result, locking pin '23 can effect corresponding immobilization of insert frame 4c in both functional positions, rotated 1800 from one another, of insert frame 4c. Locking pin 23 is also located at the middle of the total length of side rim 9c, so that with regard to the longitudinal extension as well, a symmetry is present which allows reversed insertion and retention of insert frame 4c. Displacement of locking pin 23 between its pulled-in release position and its extended locked position is accomplished by way of actuation element 22, which can be operated from both the upper side and the underside of insert frame 4c. For that purpose, actuation element 22 has on both sides a bail handle that is positioned in a corresponding recess of bottom 10c or of side rim 9c (FIGS. 12a, 12b). Actuation element 22 is coupled via a mechanical positive guide, preferably via corresponding wedge surfaces in the manner of an inclined plane, to a corresponding contact surface of locking pin 23; locking pin 23 can additionally be spring-loaded in one direction. The fundamental configuration of the actuation apparatus for locking pin 23 corresponds to the exemplary embodiment, described with reference to FIG. 14, of a further actuation apparatus for a locking pin. The only difference between the present exemplary embodiment and the exemplary embodiment as shown in FIGS. 13 and 14 is the nature of the handle, which in the exemplary embodiment according to FIGS. 13 and 14 is not bail-shaped but rather of strut-shaped configuration.

On the side opposite locking apparatus 21 (FIG. 10) and therefore opposite actuation element 22 and locking pin 23, the opposite side rim of insert frame 4c is equipped with two lugs, spaced apart from one another, that engage into recesses (not described further) of depression 3c. When locking pin 23 is unlocked, insert frame 4c has sufficient clearance within depression 3c that insert frame 4c can be taken out upward by pulling on actuation element 22. In the corresponding oblique position, the lugs on the opposite side necessarily come out of engagement with the recesses in the side edge of depression 3c, so that insert frame 4c can be freely removed upward. Reinsertion is accomplished in the reverse manner, by first introducing the lugs, which provide centering, into the corresponding recesses of the corresponding side edge of depression 3c and then releasing the bail handle of actuation element 22, so that bail handle 22 is pulled down by spring force, and the locking pin is transferred into its locked position.

Figure 13:
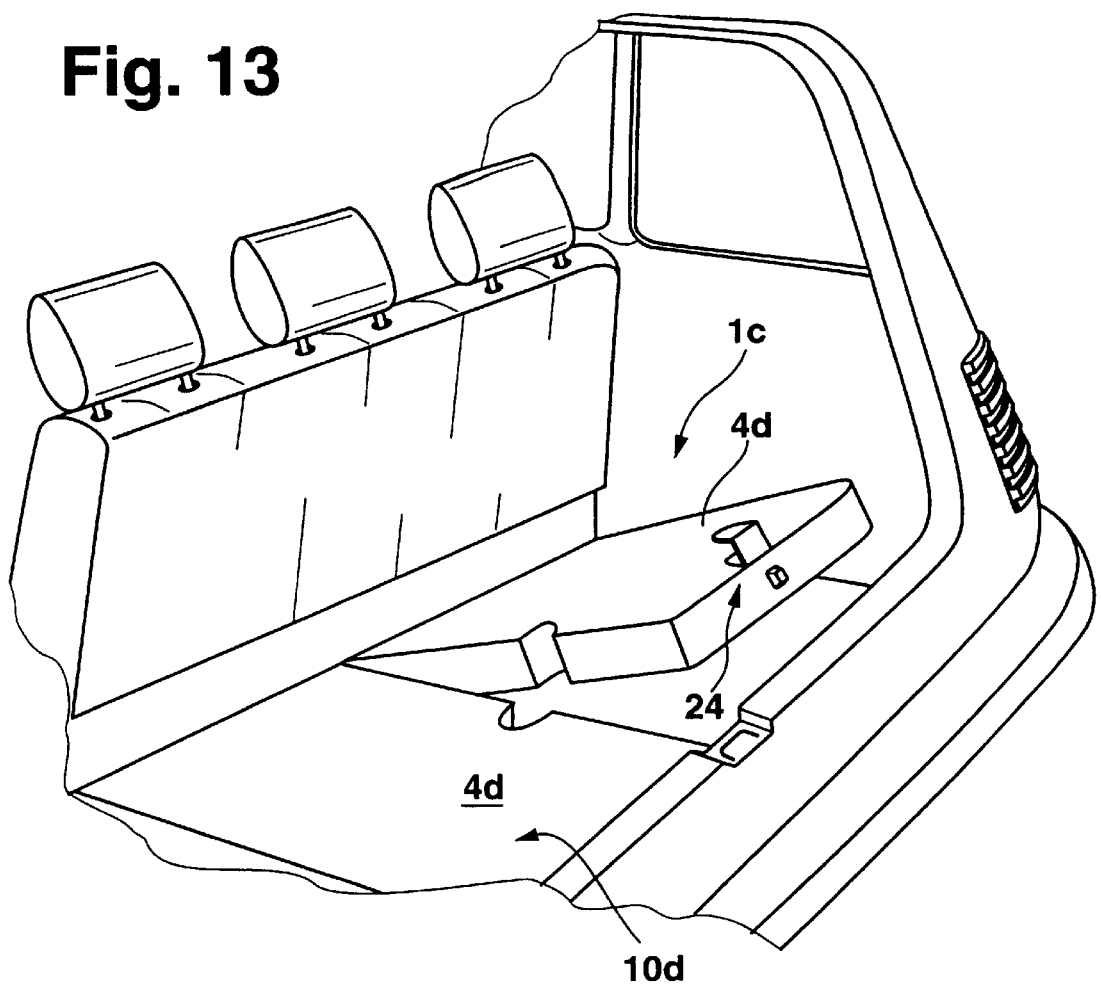
FIG. 13 shows a further cargo area of a motor vehicle having two insert frames countersunk into a recess of a cargo area floor.
Figure 14:
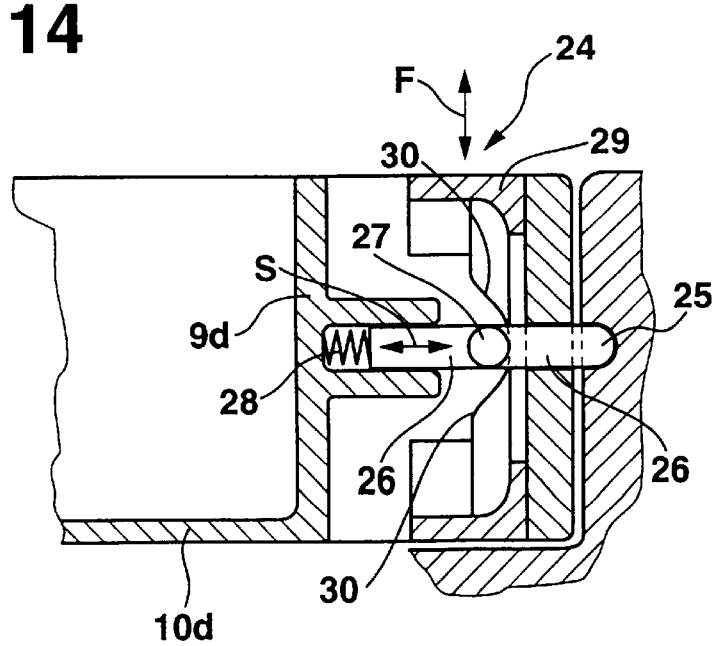
FIG. 14 shows, in an enlarged sectional representation, the attachment mechanism for immobilizing and releasing the insert frame shown in FIG. 13.

The exemplary embodiment shown in FIGS. 13 and 14 corresponds substantially to the exemplary embodiment described above as shown in FIGS. 10, 11a, 11b, 12a and 12b. In this exemplary embodiment, locking apparatus 24 for immobilizing insert frame 4d in the corresponding depression of cargo area lad is shown in detail. Side rim 9d of insert frame 4d constitutes, in the region of locking pin 26, a housing in which, on the one hand, locking pin 26 is mounted in horizontally and linearly movable fashion (double arrow S). On the other hand, actuation element 29 is guided vertically, in linearly movable fashion, at right angles to locking pin 26 in the direction of double arrow F. Locking pin 26 has two contact blocks 27, each projecting laterally outward at the same height on opposite sides, which form countersurfaces. Actuation element 29 has, at the height of locking pin 26, two limb segments that overlap locking pin 26 on both sides in forked fashion. Actuation element 29 moreover has, both above and below locking pin 26, a respective contact ridge 30, extending obliquely in wedge fashion and serving as a sliding surface, that has its minimum height at the height of contact block 27. The height of contact ridge on either side is dimensioned such that locking pin 26 can be pushed completely out of receptacle 25 of the side edge of the depression of the cargo area.

Locking pin 26 is compressively spring-loaded on the back side by a return spring 28 that is braced in a housing segment of side rim 9d. An upward pulling movement of actuation element 29 thus causes lower contact ridge 30 to slide upward along contact block 27, so that at the same time locking pin 26 is pushed out of receptacle 25 into its release position. A brief downward pushing movement on actuation element 29 causes actuation element 29 to move back into the position according to FIG. 14, so that the locking pin, because of the spring-loading by return spring 28, is pushed back into its locked position.

Figure 15:
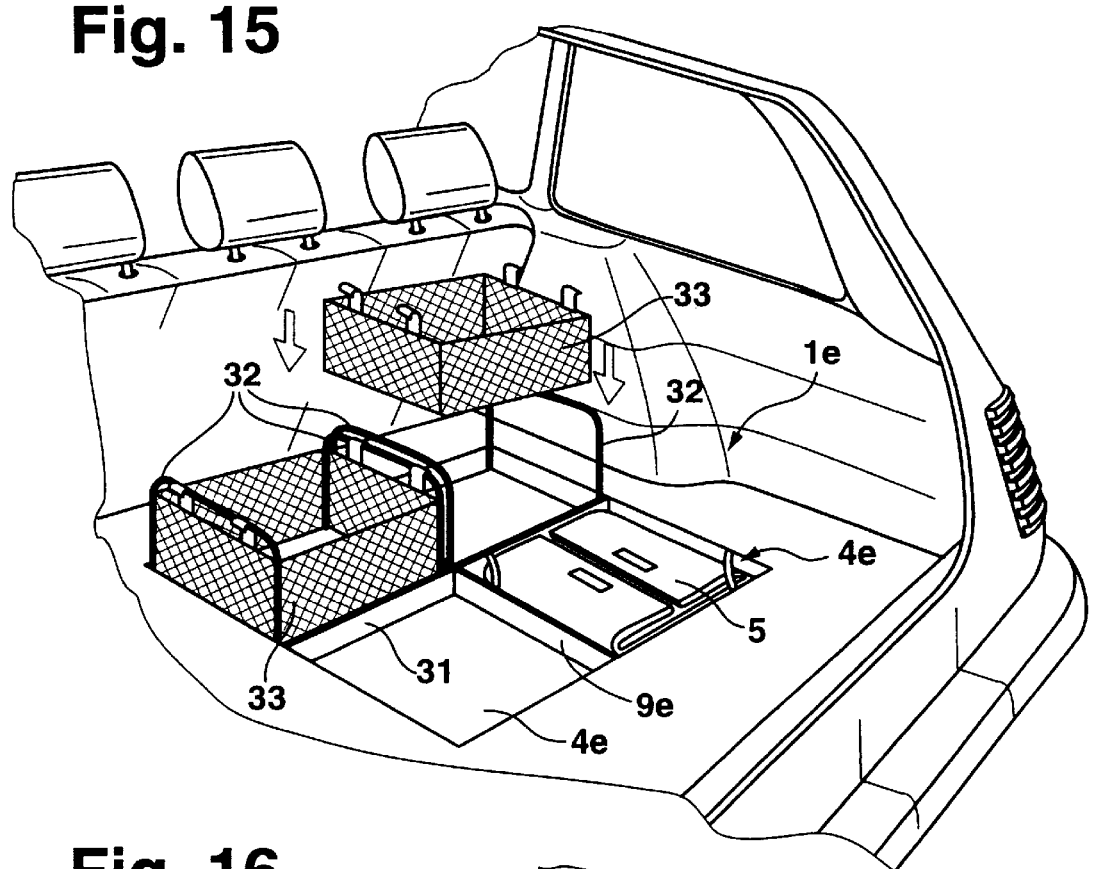
FIG. 15 shows a further cargo area for a motor vehicle with two detachable insert frames, arranged next to one another, that are equipped with additional functional inserts.
Figure 16:
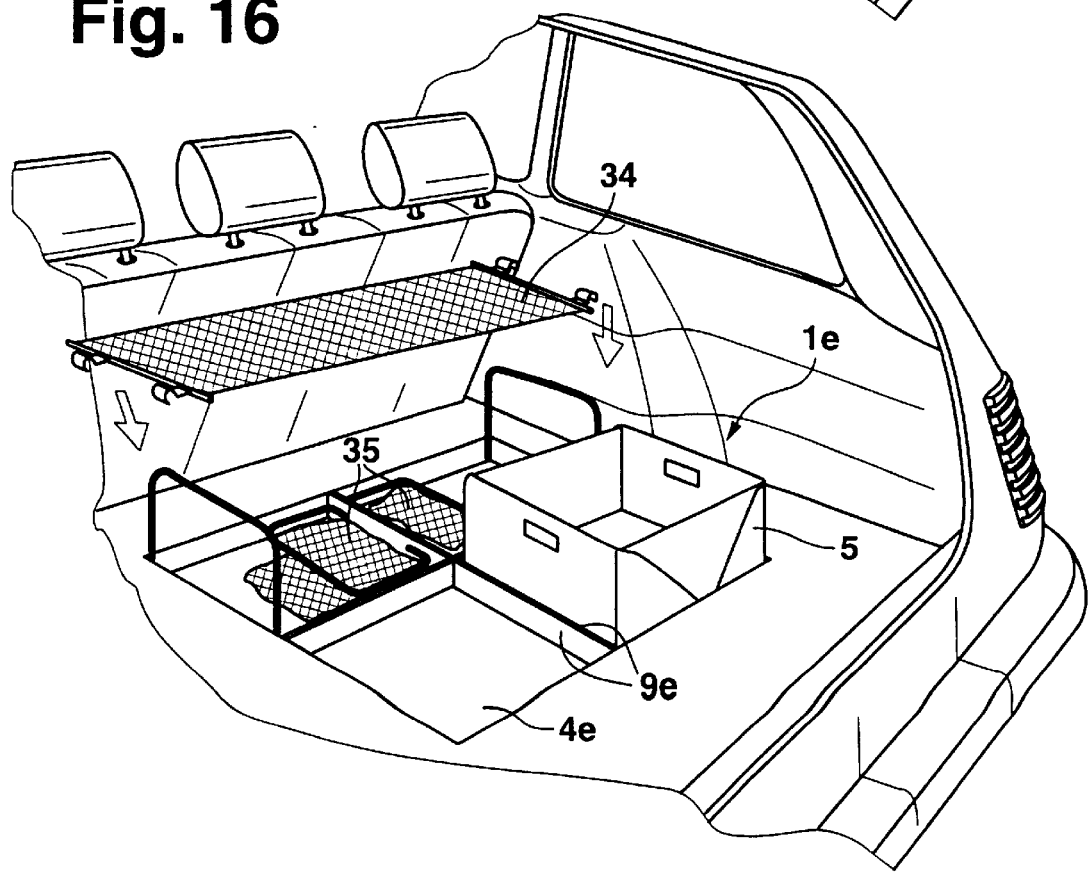
FIG. 16 shows the cargo area having the stowage apparatus according to FIG. 15, the two insert frames being shown with different functions.

In the exemplary embodiment shown in FIGS. 15 and 16, a depression that can be closed off by two insert frames 4e is provided in a cargo area 1e. Insert frames 4e correspond to insert frames 4 that have already been described with reference to FIGS. 1–4. Only the functional inserts of these insert frames 4e will therefore be additionally discussed in more detail below. The left-hand (viewed in the direction of travel) insert frame 4e has halfway along its length a partition wall 31 which forms a rear stowage compartment. Adjoining this stowage compartment toward the front is a receiving region for a collapsible wire basket 33 that can be secured with the aid of clips or suspension hooks to erectable retaining brackets 32. Retaining brackets 32 are mounted, in the same manner as for insert frames 4e arranged next to them, in pivotably movable fashion between the erected position shown and a recessed rest position. In the erected functional position, retaining brackets 32 are locked in place. In the collapsed state, they are folded down inside the respective insert frame 4e.

Rather than using two baskets 33, it is also possible for the two adjacent retaining brackets 32 to be folded down and for only the two outer retaining brackets to remain erected (FIG. 16). In this case a retaining net 34 can then stretched over the width of two insert frames 4e. Alternatively, it is also possible to provide two small retaining nets 35 that can each be stretched between the respective retaining brackets 32 of an individual insert frame 4e. All the retaining nets 34, 35 can be collapsed and stored in insert frames 4e.

Figure 17:
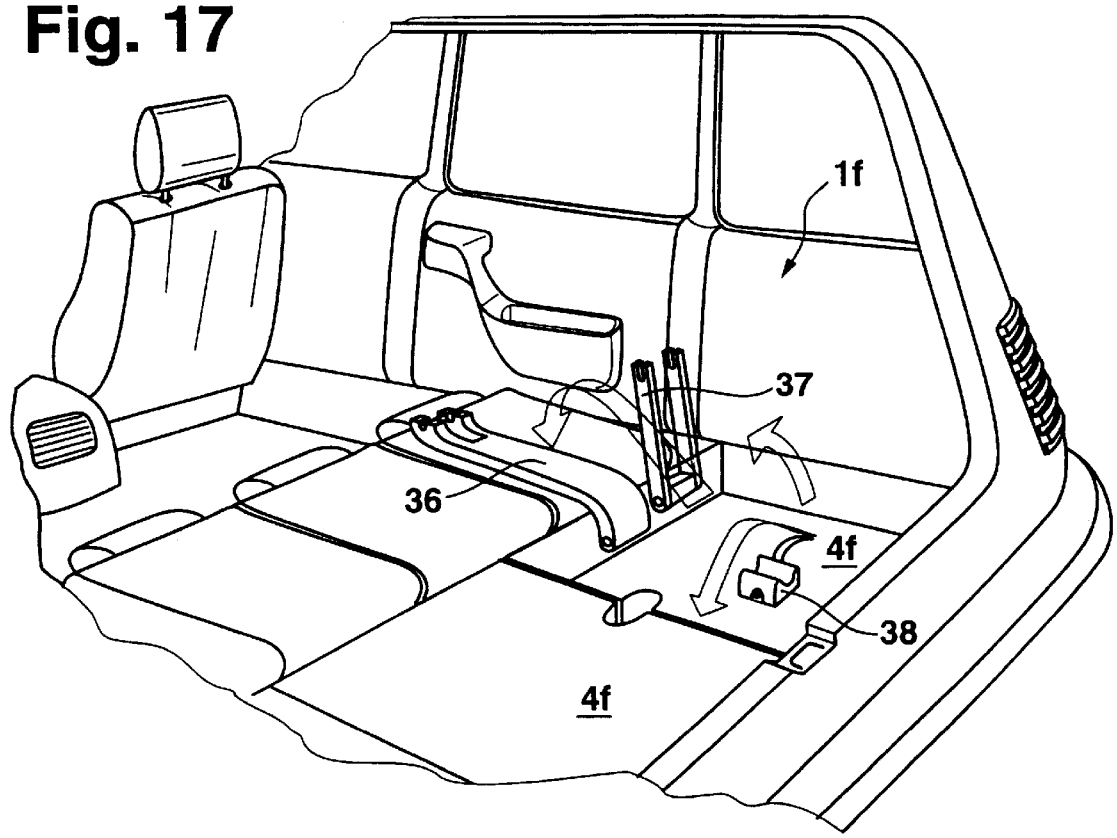
FIG. 17 shows a further cargo area of a motor vehicle having a further embodiment of a stowage apparatus according to the present invention, in which a pivotably movable bicycle stand arrangement is integrated into an insert frame.
Figure 18:
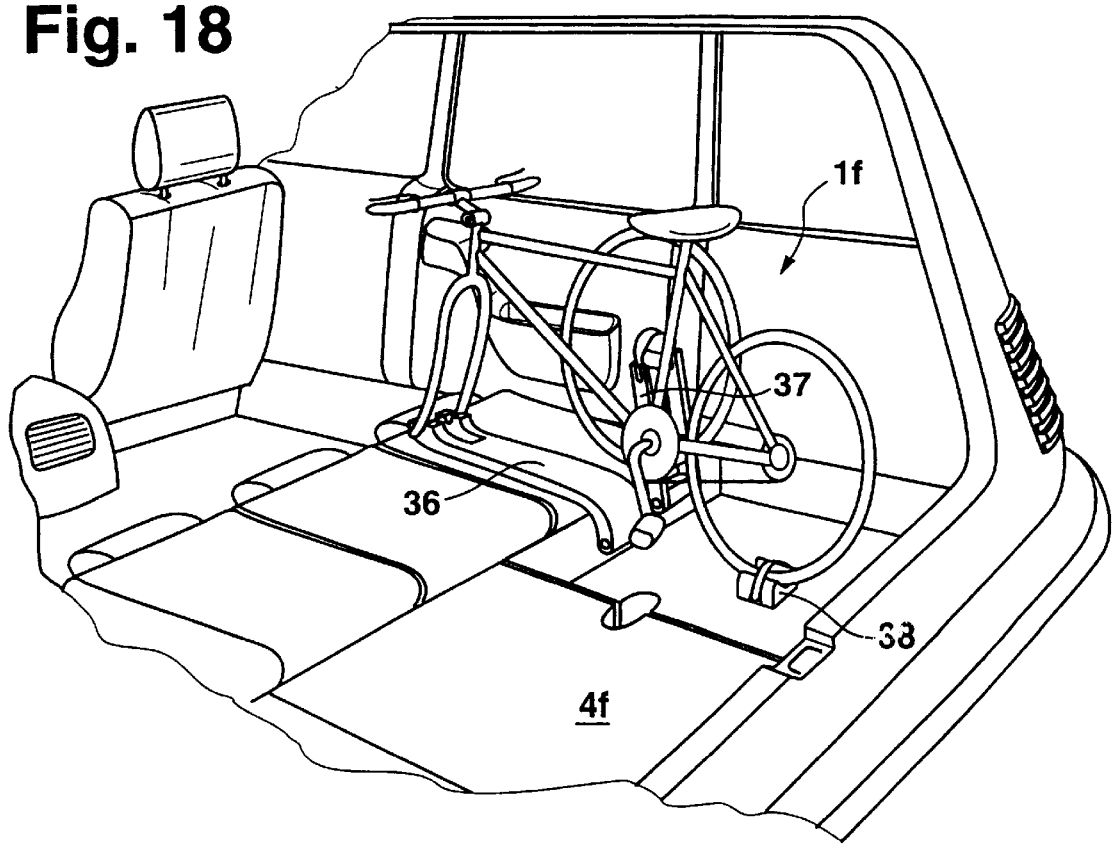
FIG. 18 shows the stowage apparatus according to FIG. 17, with a bicycle secured.

In the exemplary embodiment shown in FIGS. 17 and 18, a bicycle stand arrangement 36, 37, 38 is integrated into one insert frame 4f. This arrangement has a mount, pivotable between a rest position that is set down recessed into insert frame 4f and a folded-out functional position, for a front wheel fork of the bicycle, as well as a retaining block 38 for a rear wheel of the bicycle. In addition to mount 36, a retaining bracket 37 that is also mounted in pivotably movable fashion between a rest position set down into insert frame 4f and an erected functional position is also positioned for the front wheel in insert frame 4f. The various pivoting movements and retaining movements of the individual parts of the bicycle stand arrangement are illustrated by corresponding arrows.

Figure 19:
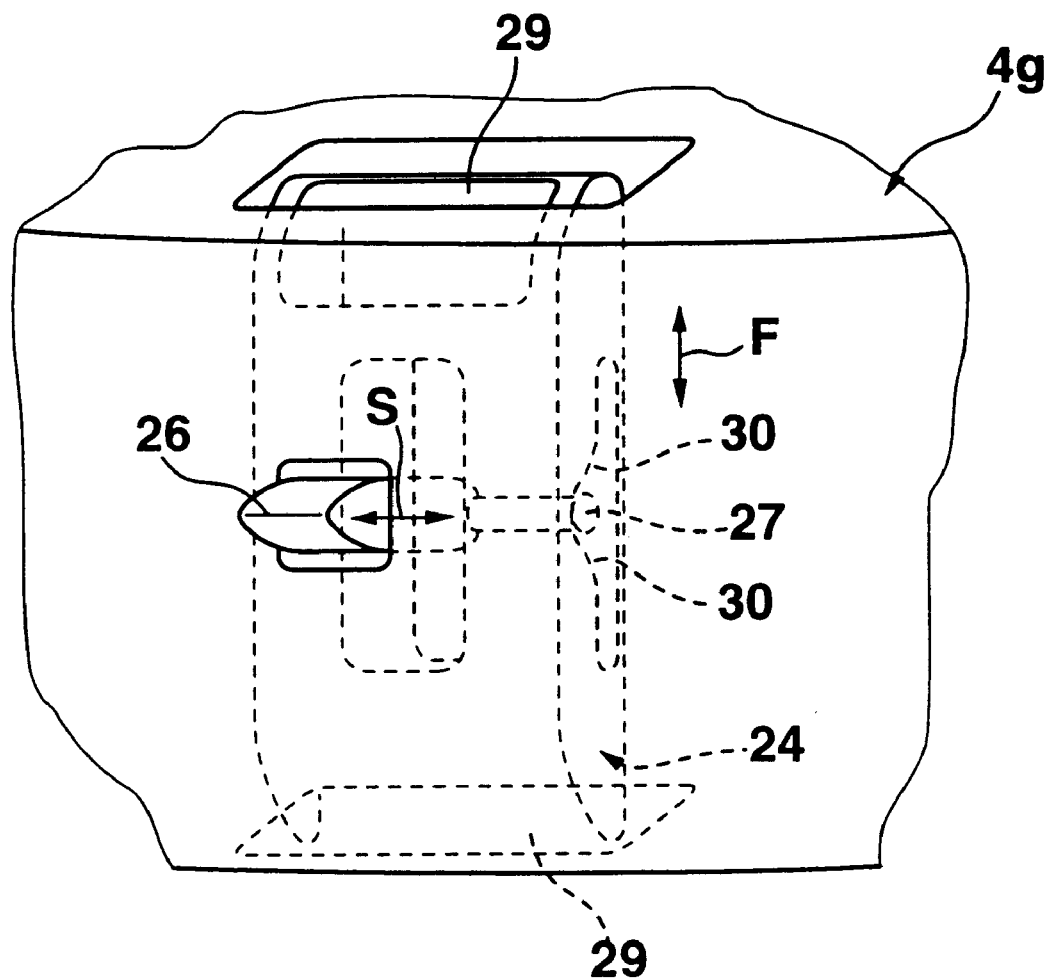
FIG. 19 shows an enlarged perspective portion of a further insert frame, similar to FIG. 13, that has attachment mechanism similar to FIG. 14.

An insert frame 4g as shown in FIG. 19 has, in a fashion similar to the representation in FIG. 14, a locking apparatus 24 whose actuation element 29 can be operated from two opposite sides, due to the fact that it can be grasped via corresponding handles from both the upper side and the underside of insert frame 4g. The actuation element is guided in vertically and linearly movable fashion in insert frame 4g, and has a central longitudinal slot in which a locking pin 26, mounted so as to move horizontally in arrow direction S in linearly movable fashion, is arranged. Locking pin 26 is equipped with one or preferably two contact pegs 27 that engage into a corresponding gated guide 30 in a side wall of actuation element 29. Locking pin 26 is compressively spring-loaded, in a manner not shown in more detail, toward its locked position. Gated guide 30 forms two oblique guiding surfaces above and below contact peg 27. As soon as actuation element 29 is pulled upward or downward out of its rest position recessed in insert frame, as shown in FIG. 19, one of the two oblique guiding surfaces displaces locking pin 26, via contact peg or pegs 27, back into a release position in which a front end of locking pin 26 terminates flush with the outer side of insert frame 4g. Preferably a further contact peg, which engages into a corresponding gated guide 30 on the opposite side of actuation element 29, is associated with contact peg 27 on the opposite side. The symmetry with which locking pin 26 is guided is thereby improved. It is sufficient for sufficient functionality, however, to provide (as shown in FIG. 19) only one corresponding contact peg 27, and also only a single gated guide 30, on one side. A movement of actuation element 29 in arrow direction F out of the rest position shown in FIG. 19 thus causes locking pin 26 to be transferred out of its locked position into the release position.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings.

What is claimed is:

1. A stowage apparatus for a cargo area of a motor vehicle having a side portion, said cargo area defined by a cargo area floor having at least one recess formed therein, said stowage apparatus comprising a stowable lid and at least one insert frame that is fitted into said recess and that is fastened on said vehicle side portion by an attachment mechanism, wherein said at least one insert frame is detachably fastened in said recess of said cargo area floor, said at least one insert frame and said recess are configured with respect to each other such that said at least one insert frame is insertable into said recess in two different positions disposed 180° with respect to one another.

2. The stowage apparatus of claim 1 wherein said at least one insert frame has a peripheral upper terminating rim that is configured as a protective profile covering a lining of the cargo area floor.

3. The stowage apparatus of claim 1 wherein said attachment mechanism is positioned such that said at least one insert frame is securable in each of said inserted positions.

4. The stowage apparatus of claim 3 wherein the attachment mechanism has at least one locking pin that is movable between a release position arranged in countersunk fashion in a side rim of said at least one insert frame and a locked position projecting outward beyond said side rim, which in the locked position extends into a corresponding receptacle of said recess of said cargo area floor.

5. The stowage apparatus of claim 4 further comprising at least one actuation element operably engaged with said at least one locking pin via a mechanical positive guide.

6. The stowage apparatus of claim 5 wherein each of said at least one locking pin is held in spring-loaded fashion in its locked position, each of said at least one locking pin having a countersurface for engaging an obliquely oriented sliding surface of a linearly movable actuation element, said actuation element movable at right angles to the locking bolt such that said locking pin countersurface and said sliding surface are slideable along one another and are positively guided by said at least one locking pin upon movement of the actuation element.

7. The stowage apparatus of claim 6 wherein said actuation element can be manipulated both from an upper side of said at least one insert frame and from an underside of said at least one insert frame and wherein said actuation element is equipped with two sliding symmetrical surfaces, one surface of which is operated from said upper side of said at least one insert frame and the other surface of which is operated from said underside of said at least one insert frame.

8. The stowage apparatus claim 1 wherein said at least one insert frame is equipped with a bottom having a trough shape that is defined by a peripheral side rim of said at least one insert frame, said peripheral side rim configured with respect to said recess depth such said bottom terminates flush with said cargo area floor when said at least one insert frame is oriented in a turned-over end position.

9. The stowage apparatus of claim 1 wherein said lid is a pivotable component of a detachable cover disposed on the side opposite said at least one insert frame bottom.

10. The stowage apparatus of claim 1 wherein at least one flexible planar structure, which is wound onto a roller-shade shaft and capable of being pulled out, is integrated into said at least one insert frame.

11. The stowage apparatus claim 1 wherein at least one functional insert is integrated into said at least one insert frame.

12. The stowage apparatus of claim 1 wherein said at least one insert frame comprises an erectable retaining bracket arrangement having a net structure extendable therefrom.

* * * * *